97. PLOWS.
[114] Plows.
CLASSIFICATION
9474 X
DIVISION.
9474 X
David Beatty and John Mears
3-4-1836
Patented March 25 1836
PLOUGH
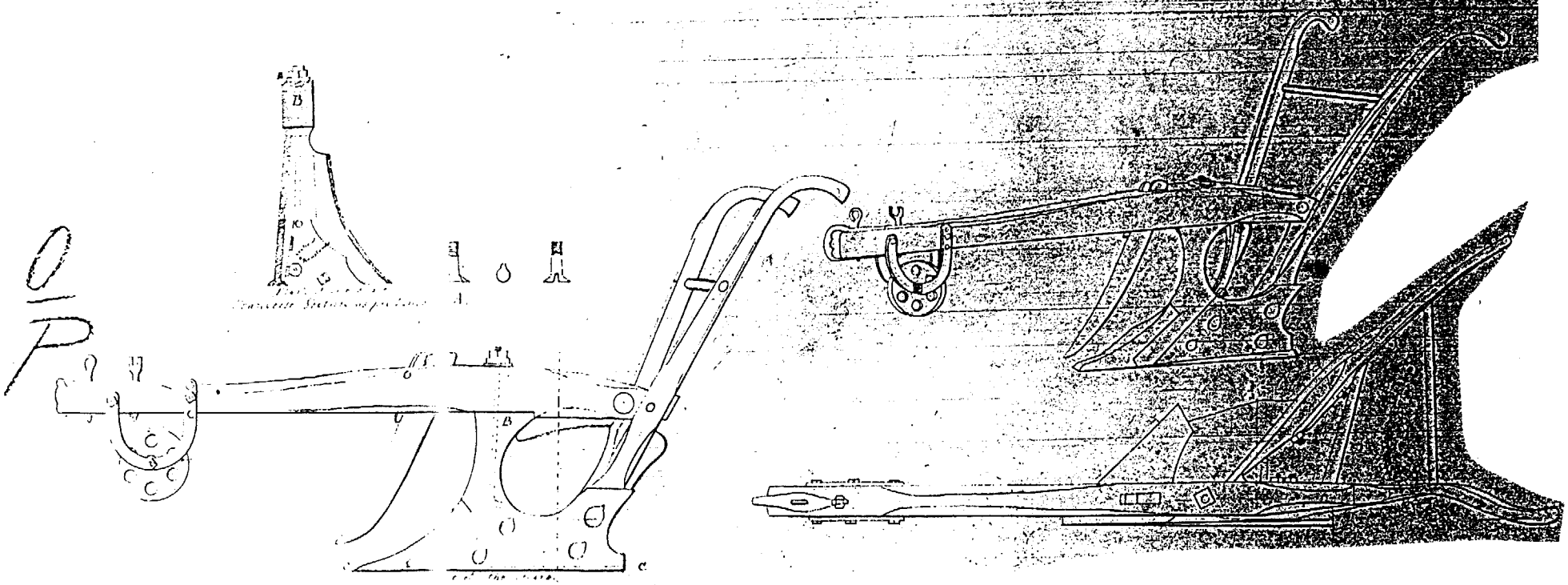

3/4/1836 9474 X

March 4, 1836 43

David Prouty & John Mears.

Letters Patent

The Schedule referred to in these Letters Patent and making part of the same containing a description in the words of the said David Prouty and John Mears themselves of their improvement in the construction of the Plough.

To all to whom these presents shall come, David Prouty of Hanover in the County of Plymouth and Commonwealth of Massachusetts, and John Mears of Dorchester in the County of Norfolk in said Commonwealth Gentlemen, send Greeting. Be it known that we the said Prouty & Mears have jointly invented made and applied to use a new and useful improvement in the construction of the Plough, which invention and improvement we describe and specify as follows, viz. Heretofore the standard and landside of the Plough has been placed perpendicular to and at right angles with the plane of the share, On this standard the beam has been placed in such manner as to form an acute angle with the landside of such extent as to place that part of the beam to which the moving power is applied at the distance of three or more inches from an extended line of the landside to the right, while the after part of the beam extends one or more inches to the left of the perpendicular of the land side near the handle; the object has been to cause the Plough "to run to the land" or hold its width of furrow, the effect produced has been an uneasy struggling motion as it meets resistance at the point wing or heel. We make our Ploughs with the standard and landside forming an acute angle with the plane of the share, the standard inclining to the right or furrow side in such manner as to enable us to place the centre of the beam on a line parallel with the land side, the fore part thereof at such distance from the extended line aforesaid as to cause the Plough to hold its width of furrow and the after part falling within the perpendicular of the land side of the Plough; the centre of it being nearly perpendicular to the centre of resistance on the mould board; which we conceive to be at about one fourth part of the lateral distance from the landside to the wing of the share, and at about one third part of the perpendicular hight from the plane of the share to the upper edge of the mouldboard. This location of the centre of resistance we base on the fact that many Ploughs which have been used in sharp sandy soils have been worn quite through at that point. the result of this formation of the plough. is a steady well balanced motion requiring less power of draft. and less effort in directing the Plough in its course.

The inclination of the standard and landside causes the Plough to cut under and take up the furrow in the form of an oblique angled Parallelogram, or like a board featheredged. which being turned over falls in level with the last furrow more readily than the right angled or squareedged work. The coulter or knife having a similar inclination cuts the roots of the grass &c. and leaves all vegetable matter on the surface at a greater distance from the under edge of the furrow which being turned over more readily falls in and is far better covered than with square edged work. The top of the Standard through which the bolt passes to secure the beam is transversely parallel to the plane of the share, and extends back from the bolt to such distance as to form a brace to the beam. when the after part is pressed down by lifting at the forepart the share being fast under a rock or other obstruction. The after part of this extension is squared in such manner that being jogged into the beam it relieves the bolt in heavy drafts.

The bolts which we use to fasten the pieces of cast iron (of which our ploughs are made) together and to the wood work are round with inverted convex heads or like the wood screws. with a projection on the under side of the head of semicircular form which fits into a groove in the countersunk part of the bolt hole as it is cast to receive it. which not only prevents its turning but also diminishes the liability of breakages at the corners of square holes. all which will more fully appear by reference to the drawing annexed to and forming part of this specification. We hereby declare that what we claim as new & of our invention is the construction of such Ploughs as aforesaid and the several parts thereof not separately but in combination for the purpose aforesaid. viz 1st The inclining the standard and Land side so as to form an acute angle with the plane of the share
2nd The placing the beam on a line parallel to the land side, within the body of the Plough and its centre nearly in the perpendicular of the centre of Resistance. 3d The forming the top of the standard for Brace and draft. We do not intend to confine our claim to any par ticular form or construction excepting such form as may be neces sary to place the beam in the perpendicular of the centre of resis tance and parallel to the land side and also to such form of the top of the standard as shall serve for brace and draft but have given such form as we deem to be most convenient which may be varied as is obvious.

In testimony that the above is a true specification of our invention we have hereto set our hand the [illegible] th day of November in the year of our Lord one thousand eight hun dred and thirty five Witnesses
Lorenzo Beaty
Ellis Gray Loring David Beaty
Colin Mcear

1116

1066 mo (Patented 4th March 1836.)

Drawing